United States Patent
Jun

(10) Patent No.: US 8,379,294 B2
(45) Date of Patent: Feb. 19, 2013

(54) DISPLAY SHEET, DISPLAY DEVICE, ELECTRONIC APPARATUS, AND METHOD FOR PRODUCING DISPLAY SHEETS

(75) Inventor: Qian Jun, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 139 days.

(21) Appl. No.: 13/105,245

(22) Filed: May 11, 2011

(65) Prior Publication Data
US 2011/0304903 A1    Dec. 15, 2011

(30) Foreign Application Priority Data

Jun. 14, 2010  (JP) .................. 2010-135322

(51) Int. Cl.
G02B 26/00 (2006.01)
G09G 3/34 (2006.01)
(52) U.S. Cl. ...................... 359/296; 345/107
(58) Field of Classification Search .................. 345/107; 359/296
See application file for complete search history.

(56) References Cited

U.S. PATENT DOCUMENTS

| 6,785,036 B1 * | 8/2004 | Berneth et al. ............. 359/271 |
| 6,831,769 B2 | 12/2004 | Holman et al. |
| 6,850,307 B2 | 2/2005 | Hinata |
| 2009/0206749 A1 | 8/2009 | Matsudate et al. |

FOREIGN PATENT DOCUMENTS

| JP | A 2001-305996 | 11/2001 |
| JP | A 2009-193797 | 8/2009 |
| JP | B2 4348180 | 10/2009 |

* cited by examiner

Primary Examiner — David N Spector
(74) Attorney, Agent, or Firm — Oliff & Berridge, PLC

(57) ABSTRACT

A display sheet includes a light-transmissive substrate, an electrode layer formed on a surface of the substrate, and a display layer that is provided on a surface of the electrode layer opposite the substrate and has a plurality of reservoirs containing at least one kind of electrophoretic particles. The electrode layer has a light-transmissive membrane electrode and a conductive portion electrically connected with the electrode. The conductive portion has a plurality of wires that are provided so as to overlap with the display layer in plan view of the display layer. The conductive portion is formed of a material with a lower electrical resistance than that of a material forming the electrode.

12 Claims, 11 Drawing Sheets

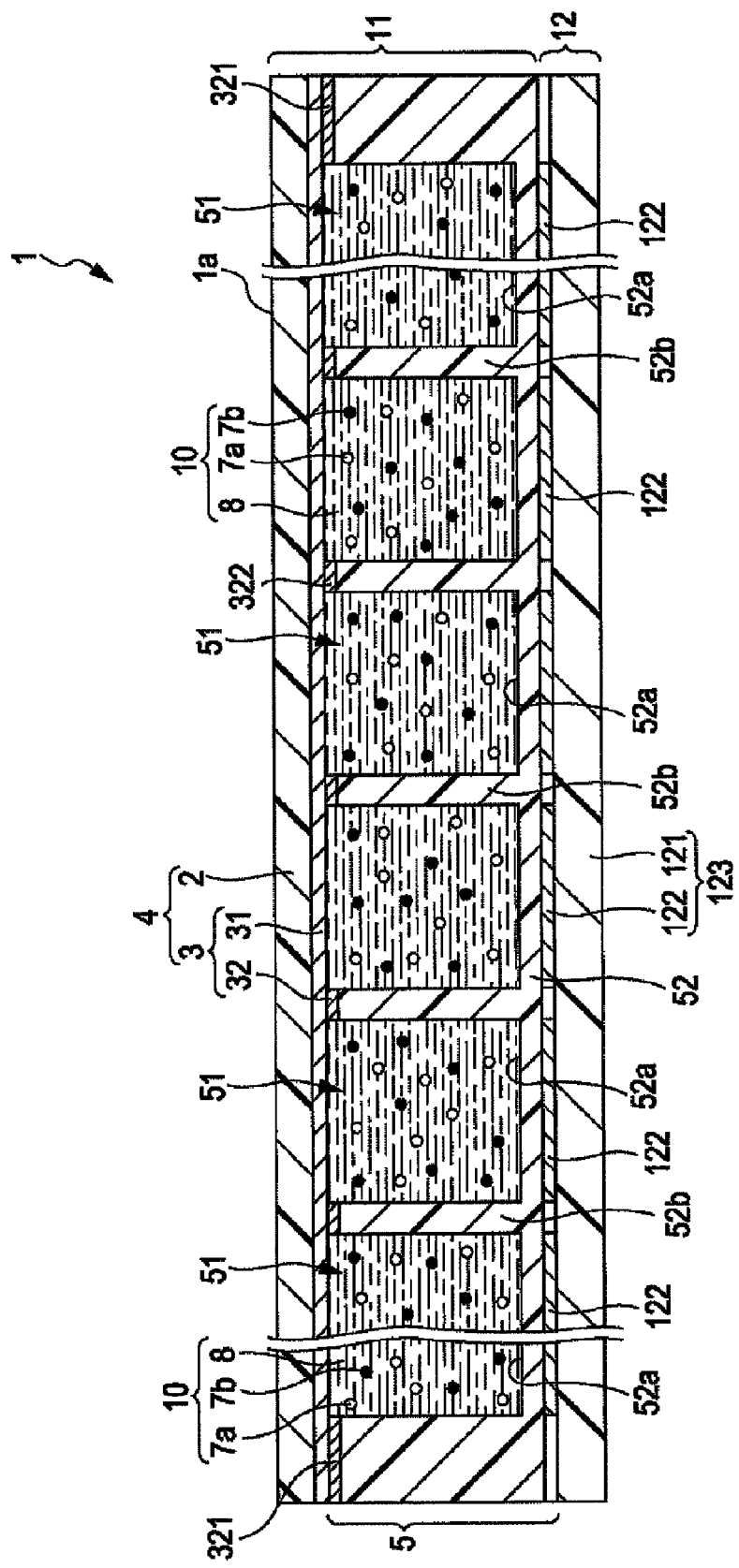

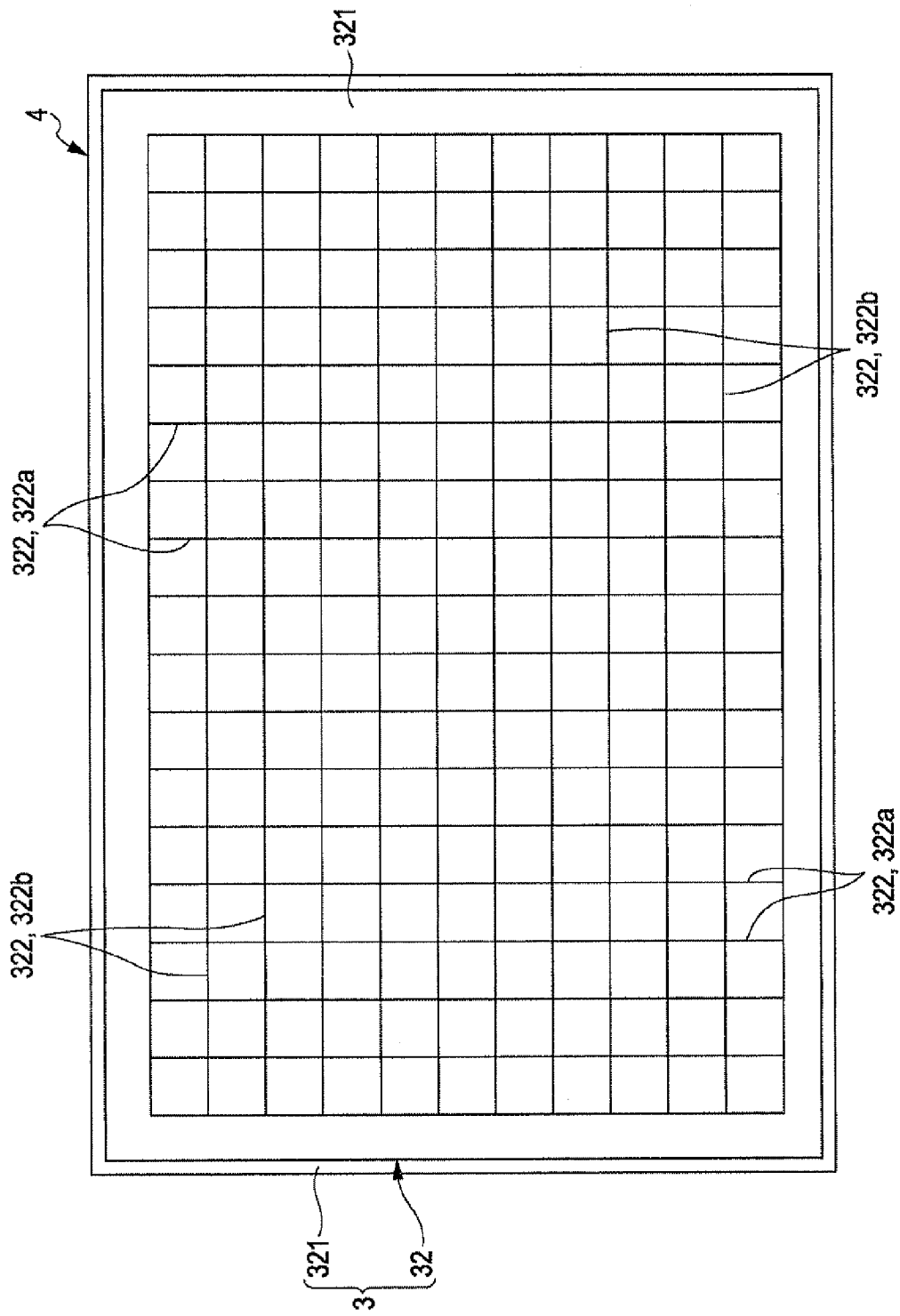

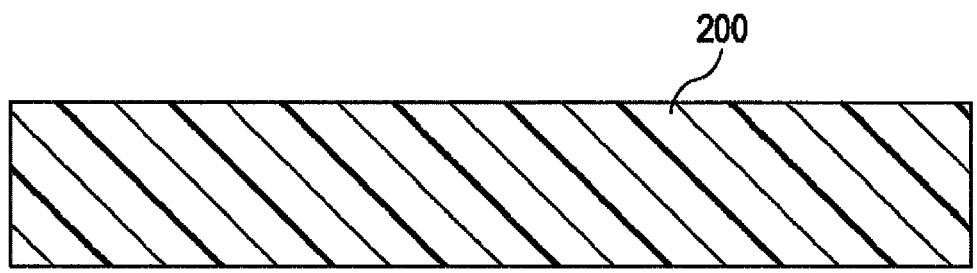
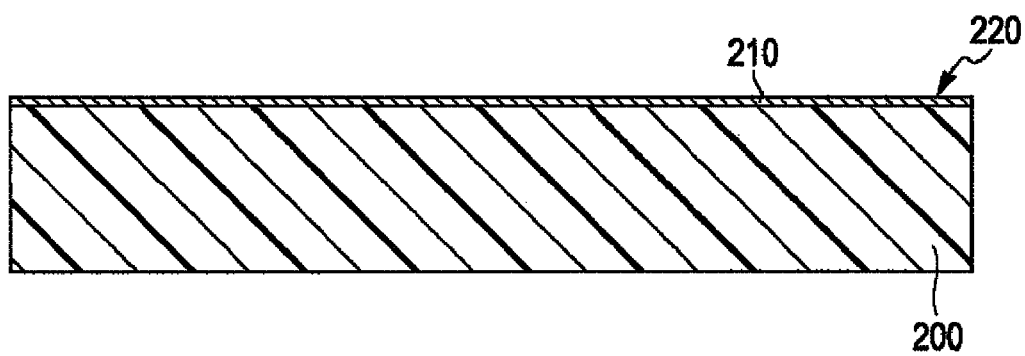
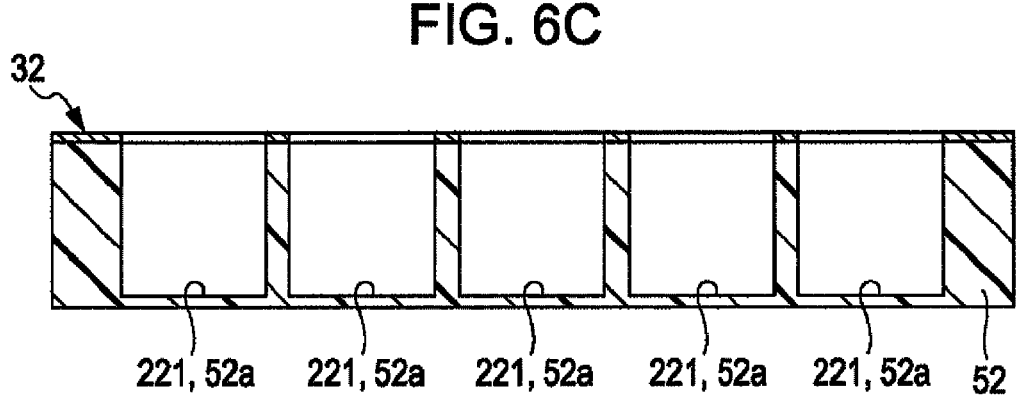

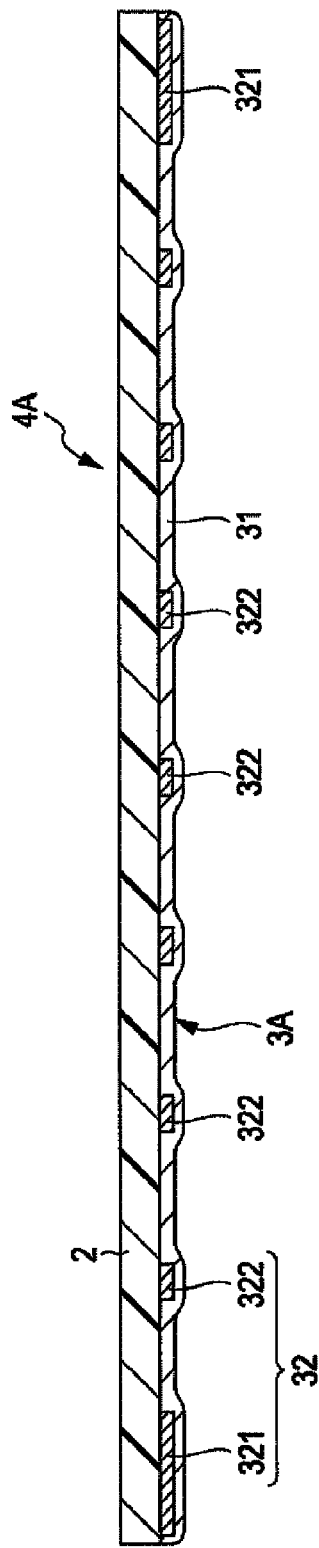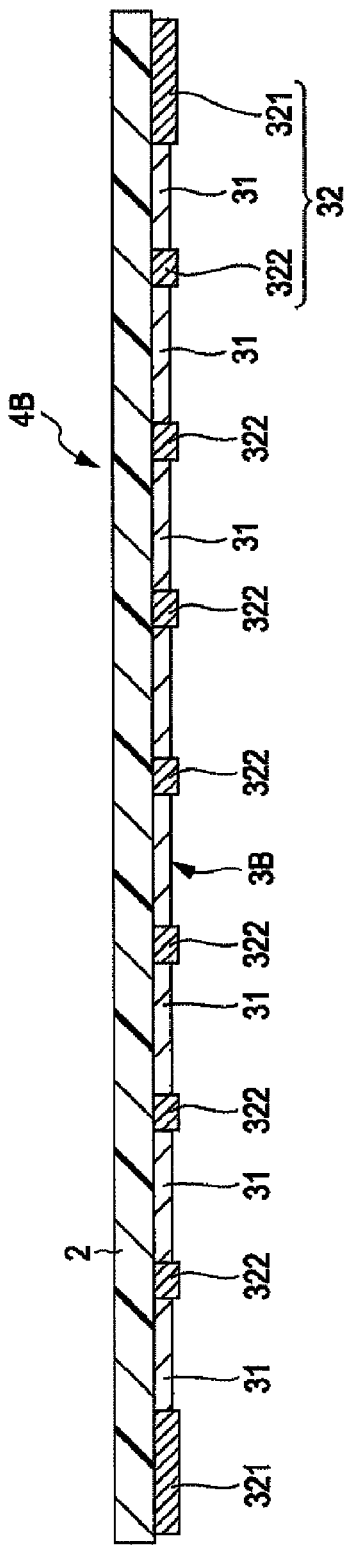

DISPLAY SHEET, DISPLAY DEVICE, ELECTRONIC APPARATUS, AND METHOD FOR PRODUCING DISPLAY SHEETS

BACKGROUND

1. Technical Field

The present invention relates to display sheets, display devices, electronic apparatuses, and methods for producing display sheets.

2. Related Art

Electrophoretic displays utilizing the electrophoresis of particles are known as components that have been employed for the image display section of electronic paper (see, for example, Japanese Patent No. 4348180). The electrophoretic displays have excellent portability and low power consumption, and are particularly suited as the image display section of electronic paper.

Japanese Patent No. 4348180 discloses a display having a front plane that includes a light-transmissive substrate, a light-transmissive electrode, an electro-optic layer and a lamination adhesive layer stacked in this order, and a backplane that is stacked on the lamination adhesive layer. The electro-optic layer has microcapsules each containing white and black electrophoretic particles. Such displays show white color by arranging the white electrophoretic particles on the light-transmissive substrate side in each microcapsule. When light is incident on the electro-optic layer (the microcapsules) through the light-transmissive substrate and the light-transmissive electrode, the white electrophoretic particles in the microcapsules reflect and diffuse the light through the light-transmissive substrate and the light-transmissive electrode.

As this mechanism shows, white color display involves incident light passing through the light-transmissive substrate and the light-transmissive electrode two times. According to the above patent, the light-transmissive substrate and the light-transmissive electrode are both colorless and transparent. However, the light transmittance through the stacked layers is not 100% but is usually 80% to 90%. Provided that the substrate has a light transmittance of 80%, the light coming out through the light-transmissive substrate and the light-transmissive electrode has only 64% of the intensity of the incident light as a result of having passed the substrate two times (80%×80%). Accordingly, the displays of Japanese Patent No. 4348180 cannot achieve a high reflectance of white light and are thus incapable of displaying luminous images.

A possible approach to solve such problems, namely to increase the light transmittance of the substrate, is to reduce the thickness of the light-transmissive electrodes. However, reducing the thickness of the light-transmissive electrodes correspondingly increases the electrical resistance of the light-transmissive electrodes. Consequently, voltage drops (uneven voltages within a plane of a light-transmissive electrode) occur when a voltage is applied to the light-transmissive electrodes, and an electric field cannot be applied with the desired intensity to the microcapsules. As a result, the displays cannot be operated stably, and display properties are deteriorated.

As described above, there is a trade-off between increasing the white color reflectance and maintaining display properties with the displays of Japanese Patent No. 4348180.

SUMMARY

Advantages of some aspects of the invention are that display sheets, display devices and electronic apparatuses are provided which can display more luminous images while suppressing the degrading in display properties, and that methods for producing such display sheets are provided.

These advantages are achieved by some aspects of the invention described below.

A display sheet according to an aspect of the invention includes: a light-transmissive flat plate substrate, an electrode layer formed on one of surface sides of the substrate, and a display layer that is provided on a surface side of the electrode layer opposite the substrate and has a plurality of reservoirs containing at least one kind of electrophoretic particles, wherein the electrode layer has a light-transmissive membrane electrode and a conductive portion electrically connected with the electrode, and the conductive portion has a plurality of wires that are provided so as to overlap with the display layer in plan view of the display layer, the conductive portion being formed of a material with a lower electrical resistance than that of a material forming the electrode.

The display sheets according to the above aspect can display more luminous images while suppressing the degrading in display properties.

In an embodiment of the display sheets, the plurality of wires are preferably provided in a grid pattern or a honeycomb pattern.

According to this embodiment, the wires are arranged evenly to the electrode and thereby voltage drops in the electrode are prevented more reliably.

In an embodiment of the display sheets, it is preferable that the electrode is formed on one surface of the substrate, and the plurality of wires are each formed on a surface of the electrode opposite the substrate.

In this manner, the structure of the electrode layer is simplified.

In an embodiment of the display sheets, it is preferable that the plurality of wires are each formed on one surface of the substrate, and the electrode is formed so as to cover the wires.

This embodiment reduces the step height between the conductive portion and the electrode, and can thereby prevent more reliably bubbles (air layers) from remaining in the vicinity of the steps.

In an embodiment of the display sheets, it is preferable that the plurality of wires are formed on one surface of the substrate, and the electrode is formed in regions between pairs of adjacent wires.

This embodiment reduces the step height between the conductive portion and the electrode, and can thereby prevent more reliably bubbles (air layers) from remaining in the vicinity of the steps. Further, the thickness of the electrode layer can be reduced.

In an embodiment of the display sheets, the plurality of wires are preferably each formed between pairs of adjacent reservoirs in plan view of the display layer.

This embodiment makes the wires less visible, and more luminous and brighter images are displayed on the display surface.

In an embodiment of the display sheets, each of the wires preferably has a light reflectance of not more than 20%.

According to this embodiment, the wires are more inconspicuous.

A display device according to an aspect of the invention includes the display sheet.

The display devices according to the above aspect can display more luminous images while suppressing the degrading in display properties.

An electronic apparatus according to an aspect of the invention includes the display device.

The electronic apparatuses according to the above aspect can display more luminous images while suppressing the degrading in display properties.

A method for producing display sheets according to an aspect of the invention includes: forming a plurality of recesses in a plate member, the recesses being open on one surface of the plate member; forming conductive wires on top areas of bulkheads formed between adjacent recesses; filling each of the recesses with an electrophoretic dispersion containing at least one kind of electrophoretic particles; and joining a lid member to the recessed plate member, the lid member having a light-transmissive flat plate substrate and a light-transmissive membrane electrode on one of surface sides of the substrate, the lid member being joined to the recessed plate member such that the electrode is in contact with the wires and covers the openings of the recesses.

In this manner, display sheets are manufactured which can display more luminous images while suppressing the degrading in display properties.

In an embodiment of the methods for producing display sheets, it is preferable that the conductive wires are formed by immersing the one surface of the plate member in a liquid that contains a material for forming the wires.

In this manner, the wires can be formed easily.

A method for producing display sheets according to another aspect of the invention includes: forming a conductive membrane on one surface of a plate member; forming a plurality of recesses in the plate member, the recesses being open on the surface of the conductive membrane; filling each of the recesses with an electrophoretic dispersion containing at least one kind of electrophoretic particles; and joining a lid member to the recessed plate member, the lid member having a light-transmissive flat plate substrate and a light-transmissive membrane electrode on one of surface sides of the substrate, the lid member being joined to the recessed plate member such that the electrode is in contact with the conductive membrane and covers the openings of the recesses.

In this manner, display sheets are manufactured which can display more luminous images while suppressing the degrading in display properties.

BRIEF DESCRIPTION OF THE DRAWINGS

The invention will be described with reference to the accompanying drawings, wherein like numbers reference like elements.

FIG. 1 is a schematic sectional view illustrating a display device according to a first embodiment of the invention.

FIG. 2 is a plan view of an electrode layer illustrated in FIG. 1.

FIGS. 6A to 6C are sectional views illustrating a method for producing the display device shown in FIG. 1.

FIG. 7 is a sectional view of a display surface side substrate included in a display device according to a second embodiment of the invention.

FIG. 8 is a sectional view of a display surface side substrate included in a display device according to a third embodiment of the invention.

DESCRIPTION OF EXEMPLARY EMBODIMENTS

The display sheets, the display devices, the electronic apparatuses, and the methods for producing display sheets will be described below based on embodiments with reference to the accompanying drawings.

First Embodiment

Figure 3A:
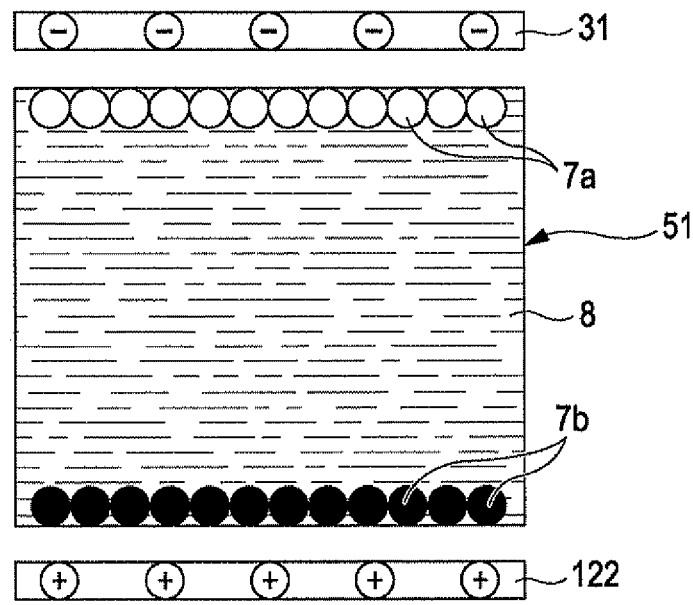
FIGS. 3A and 3B are sectional views for explaining actuation of the display device illustrated in FIG. 1.
Figure 3B:
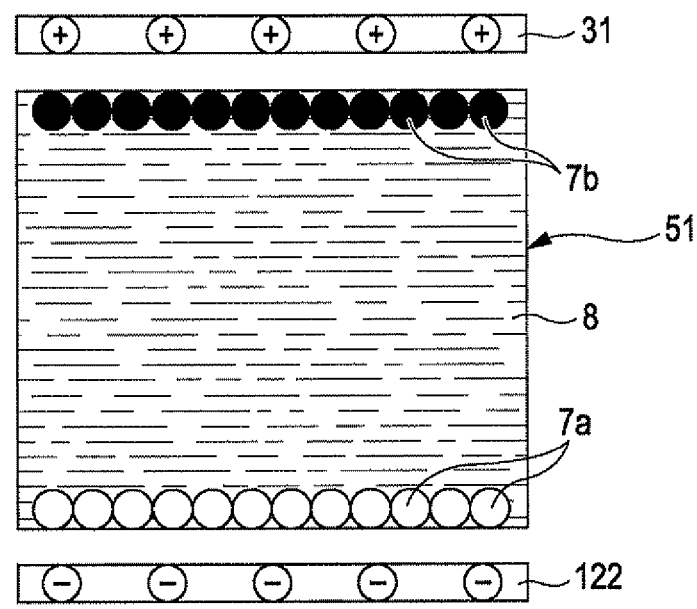

FIG. 1 is a schematic sectional view illustrating a display device according to a first embodiment of the invention. FIG. 2 is a plan view of an electrode layer illustrated in FIG. 1. FIGS. 3A and 3B are sectional views for explaining actuation of the display device illustrated in FIG. 1. FIGS. 4A to 6C are sectional views illustrating methods for producing the display device shown in FIG. 1. For convenience, the upper side in FIGS. 1 to 7 will be referred to as "upper", and the lower side will be referred to as "lower".

1. Display Devices

Display devices incorporated with a display sheet of the invention (display devices according to the invention) will be described first.

A display device (electrophoretic display device) 1 illustrated in FIG. 1 has a display sheet (front plane) 11 and a circuit substrate (backplane) 12.

The display sheet 11 has a display surface side substrate 4 that includes a substrate 2 and an electrode layer 3 formed on the lower surface of the substrate 2, and a display layer 5 provided on the lower surface of the display surface side substrate 4. The electrode layer 3 has a main membrane electrode (common electrode) 31 formed on the lower surface of the substrate 2, and a conductive portion 32 formed on the lower surface of the common electrode 31. In this embodiment, the common electrode 31 is formed on substantially the entirety of the lower surface of the substrate 2. However, the requirement herein is that the common electrode 31 should be formed at least on regions including cells 51 described later, namely, regions including areas that display images during the use of the devices.

The circuit substrate 12 has a back side substrate 123 that includes a flat plate substrate 121 and a plurality of pixel electrodes 122 provided on the upper surface of the substrate 121. The circuit substrate 12 also has circuits (not shown) with switching elements such as TFTs provided in the back side substrate 123.

These and other members will be described below.

Display Layers 5

As shown in FIG. 1, the display layer 5 has an array of cells (reservoirs) 51 in a matrix pattern, the cells 51 containing an electrophoretic dispersion 10. The display layer 5 has a base 52 in which a plurality of recesses 52a are formed in a matrix pattern. The recesses 52a are covered with a display surface side substrate 4, thereby defining the plurality of cells 51.

The base 52 has relatively high insulating properties and has impermeability to the electrophoretic dispersion 10. The materials for forming the substrates 52 are not particularly limited. Exemplary materials include polyolefins such as polyethylene, polypropylene and ethylene-vinyl acetate copolymer, modified polyolefins, polyamides (such as nylon 6 and nylon 66), thermoplastic elastomers such as styrene elastomers, polyvinyl chloride elastomers, polyurethane elastomers, polyester elastomers, fluororubbers and polyethylene chloride elastomers, and copolymers, blends and polymer alloys based on these polymers. These materials may be used singly, or two or more may be used in combination.

The electrophoretic dispersion 10 contained (encapsulated) in each cell 51 contains electrophoretic particles 7 dispersed in a liquid phase dispersion medium 8. The electrophoretic particles 7 include positively or negatively charged white particles (first particles) 7a and black particles (second particles) 7b charged with a polarity opposite to that of the white particles 7a.

The electrophoretic particles 7 may be dispersed in the liquid phase dispersion medium 8 by a single or a combination of two or more methods such as paint shaker methods, ball mill methods, media mill methods, ultrasonic dispersion methods and stirring dispersion methods.

The liquid phase dispersion medium 8 suitably has low solvent properties for the members configuring the cells 51 and relatively high insulating properties. Examples of the liquid phase dispersion media 8 include various kinds of water (such as distilled water and pure water), alcohols such as methanol, cellosolves such as methyl cellosolve, esters such as methyl acetate, ketones such as acetone, aliphatic hydrocarbons (liquid paraffins) such as pentane, alicyclic hydrocarbons such as cyclohexane, aromatic hydrocarbons such as benzene, halogenated hydrocarbons such as methylene chloride, aromatic heterocyclic compounds such as pyridine, nitriles such as acetonitrile, amides such as N,N-dimethylformamide, carboxylate salts, and various oils such as silicone oils. These media may be used singly or as a mixture.

In particular, it is preferable that the liquid phase dispersion media 8 contain aliphatic hydrocarbons (liquid paraffins) or silicone oils as main components. The liquid phase dispersion media 8 containing liquid paraffins or silicone oils as main components are highly effective in suppressing the agglomeration of the electrophoretic particles 7, and thereby allow for more reliable prevention or suppression of deterioration of the display performance of the display device 1 with time. Further, liquid paraffins and silicone oils are preferable from the viewpoints of excellent weather resistance due to the absence of unsaturated bonds, and also high safety.

Where necessary, the liquid phase dispersion media 8 may contain additives such as electrolytes, (anionic or cationic) surfactants such as alkenyl succinates, metallic soaps, resin materials, rubber materials, oils, varnishes, charge control agents in the form of particles such as compounds, dispersants such as silane coupling agents, lubricants and stabilizers. In order to prepare colored liquid phase dispersion media 8, various dyes such as anthraquinone dyes, azo dyes and indigoid dyes may be dissolved in the liquid phase dispersion media 8 as required.

The electrophoretic particles 7 have charges and can be electrophoresed in the liquid phase dispersion medium 8 by the application of an electric field. Any electrophoretic particles 7 may be used without limitation as long as they are charged. At least one kind of pigment particles, resin particles and composite particles thereof is suitably used. These particles are easily producible, and controlling the charges is relatively easy.

Exemplary pigments that constitute the pigment particles include black pigments such as aniline black, carbon black, titanium black and copper chromite, white pigments such as titanium oxide and antimony oxide, azo pigments such as monoazo compounds, yellow pigments such as isoindolinone and chrome yellow, red pigments such as quinacridone red and chrome vermilion, blue pigments such as phthalocyanine blue and indanthrene blue, and green pigments such as phthalocyanine green. These pigments may be used singly, or two or more may be used in combination.

Exemplary resin materials that constitute the resin particles include acrylic resins, urethane resins, urea resins, epoxy resins, polystyrenes and polyesters. These materials may be used singly, or two or more may be used in combination.

Examples of the composite particles include pigment particles that are surface-coated with resin materials or other pigments, resin particles that are surface-coated with pigments, and particles composed of a mixture containing pigments and resin materials in an appropriate composition ratio.

Examples of the pigment particles that are surface-coated with other pigments include titanium oxide particles that are surface-coated with silicon oxide or aluminum oxide. Such particles may be suitably used as the white particles 7a. Carbon black particles or surface-coated carbon black particles may be suitably used as the black particles 7b.

The shapes of the electrophoretic particles 7 are not particularly limited. Spherical shapes are preferred.

The average particle diameter of the electrophoretic particles 7 is not particularly limited, but is preferably 0.1 to 5 µm, more preferably 0.1 to 4 µm, and still more preferably 0.1 to 3 µm. If the electrophoretic particles 7 have an average particle diameter of less than 0.1 µm, sufficient chromaticity cannot be obtained and the contrast is lowered, possibly resulting in unclear images. Electrophoretic particles 7 having an average particle diameter in excess of 5 µm have to be pigmented to a greater degree than necessary and thus involve an increased amount of pigments or the like. Further, such large electrophoretic particles may have difficulty in quick migration upon application of a voltage and may lower the response speed (display responsiveness) of electrophoretic display devices.

The average particle diameter of the electrophoretic particles 7 is a volume average particle diameter measured with a dynamic light scattering particle size distribution analyzer (for example, LB-500 manufactured by HORIBA Ltd.).

Preferably, the specific gravity of the electrophoretic particles 7 is substantially equal to that of the liquid phase dispersion medium 8. The electrophoretic particles 7 having such a specific gravity can remain dispersed at fixed positions in the liquid phase dispersion medium 8 for a long time even after the application of voltage between the common electrode 31 and pixel electrodes 122 is terminated. That is, the display device 1 attains memory (retention) characteristics and can keep displaying information for a long time.

Display Surface Side Substrates 4

A display surface side substrate 4 is provided on the upper side of the display layer 5 and covers the plurality of recesses 52a. The display surface side substrate 4 is composed of a laminate including a substrate 2 and an electrode layer 3.

The substrate 2 is composed of a sheet (flat plate) member. The substrate 2 is substantially colorless and transparent, and may be flexible or rigid. Preferably, the substrate 2, and a substrate 121 described later, have flexibility. Using flexible substrates 2 and 121 provides a flexible display device 1. Such a flexible display device 1 is useful in the manufacturing of, for example, electronic paper.

As regards the flexible substrates 2, the materials thereof are not particularly limited and include polyesters such as PET (polyethylene terephthalate) and PEN (polyethylene naphthalate), polyolefins such as polyethylene, modified polyolefins, polyamides, thermoplastic polyimides, polyethers, polyether ether ketones, thermoplastic elastomers such as polyurethane elastomers and polyethylene chloride elastomers, and copolymers, blends and polymer alloys based on these polymers. These materials may be used singly, or two or more may be used in combination.

The average thickness of the substrate 2 is not particularly limited and may be determined appropriately depending on the material, the usage and the like. In the case of substrates having flexibility, the thickness is preferably about 20 μm to 500 μm, and more preferably about 25 μm to 250 μm. The thickness in this range allows for the display device 1 to be thinner as well as have flexibility and strength.

The electrode layer 3 is formed on the lower surface of the substrate 2. The electrode layer 3 is composed of a common electrode 31 formed on the lower surface of the substrate 2, and a conductive portion formed on the lower surface of the common electrode 31. In this simple manner, the laminate made up of the common electrode 31 and the conductive portion 32 constitutes the electrode layer 3. Further, manufacturing such an electrode layer 3 is relatively easy and may be achieved by forming the common electrode 31 and thereafter the conductive portion 32.

The common electrode 31 is in the form of a membrane, and covers at least functional regions (regions including the cells 51) of the display layer 5 in plan view of the display layer 5. The common electrode 31 is substantially colorless and transparent. The colorless and transparent common electrode 31 and substrate 2 permit visual recognition of the electrophoretic particles 7 in the microcapsules 55 through the display surface side substrate 4 (display surface 1a).

The materials for forming the common electrode 31 are not particularly limited as long as they are substantially electrically conductive. Exemplary materials include metal materials such as gold, silver, copper, aluminum and alloys containing these metals, carbon materials such as carbon black, electron-conductive polymer materials such as polyacetylene, polyfluorene and derivatives thereof, ion-conductive polymer materials composed of matrix resins such as polyvinyl alcohols and polycarbonates in which ionic substances such as NaCl and $Cu(CF_3SO_3)_2$ are dispersed, and conductive oxide materials such as indium oxide (IO), indium tin oxide (ITO) and fluorine-doped tin oxide (FTO). These conductive materials may be used singly, or two or more may be used in combination.

The conductive portion 32 is formed on the lower surface of the common electrode 31. As illustrated in FIG. 2, the conductive portion 32 has a frame trim 321 provided on the trim of the common electrode 31, and a plurality of wires 322 formed inside the trim 321.

The conductive portion 32 is composed of a material that has lower electrical resistance (volume resistance) than that of the material forming the common electrode 31. Thus, compared to when the conductive portion 32 is omitted, the electrical resistance of the electrode layer 3 (the electrical resistance in the plane direction of the common electrode 31) is lowered. Accordingly, use of the conductive portion 32 enables further reduction of the thickness of the common electrode 31 (for example, to approximately 1 nm to 10 nm) while suppressing the occurrence of voltage drops (uneven voltages within the plane of the common electrode 31). The thinner common electrode 31 achieves higher light transmittance therethrough and provides higher brightness (in this embodiment, white color reflectance as described later) of images displayed on the display surface 1a. That is, the display devices 1 having the conductive portion 32 can display brighter images while maintaining display properties.

In plan view of the display surface side substrate 4, the trim 321 encloses all the cells 51 that are substantially used for image display. In other words, the trim 321 is provided around the display region of the display layer 5 in which images are displayed. When cells that are not used for image display are present outside the display region, the trim 321 may exclude such cells.

Providing the trim 321 in the above manner prevents the trim 321 from overlapping with the images displayed on the display surface 1a. Thus, more luminous images can be displayed on the display surface 1a.

The width of the trim 321 is designed to be larger than the width of the wires 322. For example, the width of the trim 321 is preferably not less than 1 mm. Since the electrode layer 3 is connected via the trim 321 to circuits on the circuit substrate 12, the trim 321 having the above width ensures stable operation of the display device 1. To prevent the increase in size of the display device 1, the width of the trim 321 is preferably not more than 10 mm.

In plan view of the display layer 5, the plurality of wires 322 overlap with at least the display region of the display layer 5. The wires 322 that are overlapped linearly (or zonally) with the display region of the display layer 5 minimize adverse influences of the conductive portion 32 on image display. Further, such arrangements of wires can distribute the conductive portion 32 evenly on the common electrode 31.

The plurality of wires 322 are arranged in a grid pattern. That is, the wires 322 include a plurality of first wires 322a extending in the vertical direction in FIG. 2, and a plurality of second wires 322b extending in the horizontal direction in FIG. 2. Such an arrangement results in the wires 322 being evenly distributed on the lower surface of the common electrode 31 in the display region, and thereby suppresses the occurrence of voltage drops in the common electrode 31 more reliably.

In plan view of the display layer 5, the first wires 322a and the second wires 322b are each arranged so as not to straddle the cells 51 (so as not to pass over the cells 51). That is, the first wires 322a and the second wires 322b are each provided between two neighboring cells 51. Such provision makes the wires 322 inconspicuous, and more luminous images can be displayed on the display surface 1a.

In this embodiment, the first wires 322a and the second wires 322b are provided along the upper surface of bulkheads 52b partitioning the neighboring cells 51 (recesses 52a). That is, the first wires 322a and the second wires 322b are provided between neighboring cells 51. Such provision facilitates the formation of the wires 322 as will be described later, and makes the wires 322 more inconspicuous. In this embodiment, the wires 322 are formed so as to divide the cells 51. In other words, the wires are arranged so that a single one of the cells 51 is included within a region enclosed by a pair of neighboring first wires 322a and a pair of neighboring second wires 322b. The wire arrangements, however, are not limited thereto and may be such that a plurality of cells 51 are included within a region enclosed by a pair of neighboring first wires 322a and a pair of neighboring second wires 322b.

The width of each of the first wires 322a and the second wires 322b is not particularly limited, but is preferably smaller than the width of the upper surface of the bulkheads 52b. For example, the width is preferably about 10 nm to 500 nm. The wires 322 having such a width are more inconspicuous.

The pitches of the first wires 322a and the second wires 322b are not particularly limited, but are preferably about 50 μm to 200 μm. With these pitches, the density of the wires 322 is appropriate and the electrical resistance of the common electrode 31 can be lowered more evenly within the plane of the common electrode 31.

The materials for forming the conductive portions 32 are not particularly limited as long as they have lower electrical resistance than that of the materials forming the common electrodes 31. Exemplary materials include metal materials such as gold, silver, copper, aluminum and alloys containing these metals, carbon materials such as carbon black, electron-conductive polymer materials such as polyacetylene, polyfluorene and derivatives thereof, ion-conductive polymer materials composed of matrix resins such as polyvinyl alcohols and polycarbonates in which ionic substances such as NaCl and $Cu(CF_3SO_3)_2$ are dispersed, and conductive oxide materials such as indium oxide (IO), indium tin oxide (ITO) and fluorine-doped tin oxide (FTO). These conductive materials may be used singly, or two or more may be used in combination. When the common electrode 31 is ITO as an example, the conductive portion 32 may be composed of aluminum or chromium oxide (CrO).

Of the trim 321 and the wires 322, the surface of at least the wires 322 has lower light reflectance than that of the common electrode 31 and the bulkheads 52b. That is, it is preferable that the surface of the wires 322 has a light reflectance of not more than 20% and is substantially black. The reflectance in black display mode described later may be thereby lowered, and the display contrast is enhanced.

Back Side Substrates 123

The back side substrate 123 has a flat plate substrate 121 and a plurality of pixel electrodes 122 on the upper surface of the substrate 121.

The substrate 121 is composed of a sheet (flat plate) member. The substrate 121 may be flexible or rigid, but is preferably flexible as described above. The substrate 121 may be or may not be light-transmissive. The materials and the thickness of the substrates 121 may be similar to those of the substrates 2, and thus the description thereof is omitted herein.

The plurality of pixel electrodes 122 are arranged in a matrix pattern on the substrate 121. Each pixel electrode 122 is connected to the switching element. In this structure, the common electrode 31 and a single pixel electrode 122 that overlap with each other constitute a pixel. The application of a voltage between the common electrode 31 and the pixel electrode 122 creates an electric field therebetween, which acts on the electrophoretic particles 7 in the cell 51.

In the structure shown in FIG. 1, a single pixel contains one cell 51. However, the structures are not limited thereto, and a single pixel may contain a plurality of cells 51.

2. Actuation of Display Devices

The display devices 1 may be actuated as follows.

Hereinbelow, the description will be given with respect to a single cell 51 containing positively charged white particles 7a and negatively charged black particles 7b.

White Display Mode

Referring to FIG. 3A, a voltage is applied between a common electrode 31 and a pixel electrode 122 such that the common electrode 31 has a negative potential and the pixel electrode 122 has a positive potential. The voltage application generates an electric field that acts on the white particles 7a and the black particles 7b in the cell 51. The white particles 7a migrate (are electrophoresed) toward the common electrode 31 and are attracted to the common electrode 31, whilst the black particles 7b move toward the pixel electrode 122 and are attracted to the pixel electrode 122. When this cell 51 is viewed from the side of the display surface 1a, the white particles 7a display the white color.

Black Display Mode

Referring to FIG. 3B, a voltage is applied between the common electrode 31 and the pixel electrode 122 such that the common electrode 31 has a positive potential and the pixel electrode 122 has a negative potential in contrast to the white display mode. The voltage application generates an electric field that acts on the white particles 7a and the black particles 7b in the cell 51. The white particles 7a migrate (are electrophoresed) toward the pixel electrode 122 and are attracted to the pixel electrode 122, whilst the black particles 7b move toward the common electrode 31 and are attracted to the common electrode 31. When this cell 51 is viewed from the side of the display surface 1a, the black particles 7b display the black color.

The desired image may be displayed on the display surface 1a by selecting whether the cells 51 display the white color or the black color, namely by appropriately combining the cells 51 in white display mode and the cells 51 in black display mode.

3. Methods for Manufacturing Display Devices

The display devices 1 may be manufactured as described below.

A method for producing a display device 1 includes a step A1 of forming a base 52, a step A2 of forming wires 322 on the upper surface of bulkheads 52b of the base 52, a step A3 of filling recesses 52a of the base 52 with an electrophoretic dispersion 10, a step A4 of providing a substrate 2 having a common electrode 31 and joining the substrate 2 so as to cover the openings of the recesses 52a, thereby producing a display sheet 11, and a step A5 of joining the display sheet 11 from the step A4 with a circuit substrate 12. Hereinbelow, the steps A1 to A5 will be sequentially described That is.

Step A1

Figure 4A:
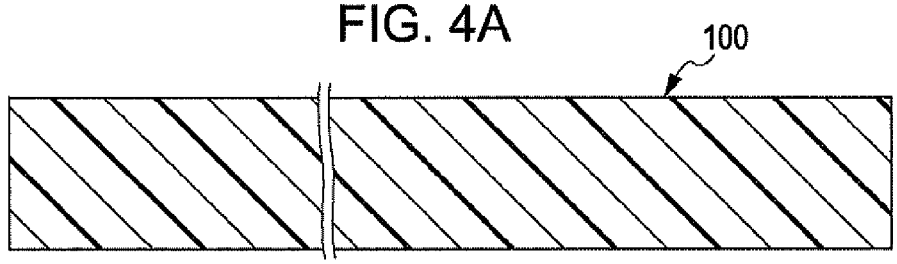
FIGS. 4A to 4D are sectional views illustrating a method for producing the display device shown in FIG. 1.
Figure 4B:
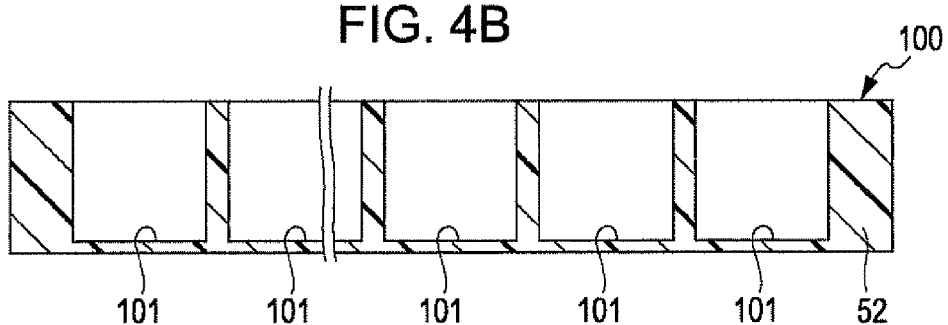

Referring to FIG. 4A, a plate member 100 is provided. In the member 100, a plurality of recesses 101 that are open on the upper surface of the member are formed in a matrix pattern as illustrated in FIG. 4B. In this manner, a base 52 having a plurality of recesses 52a is obtained. The recesses 101 may be formed by known methods such as various etching methods including wet etching and dry etching, and sand-blasting methods.

Step A2

Figure 4C:
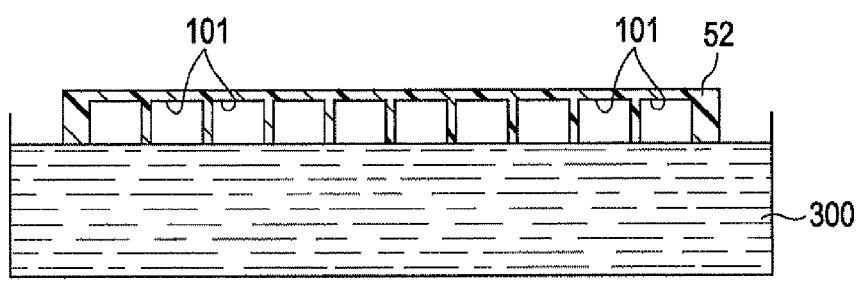
Figure 4D:
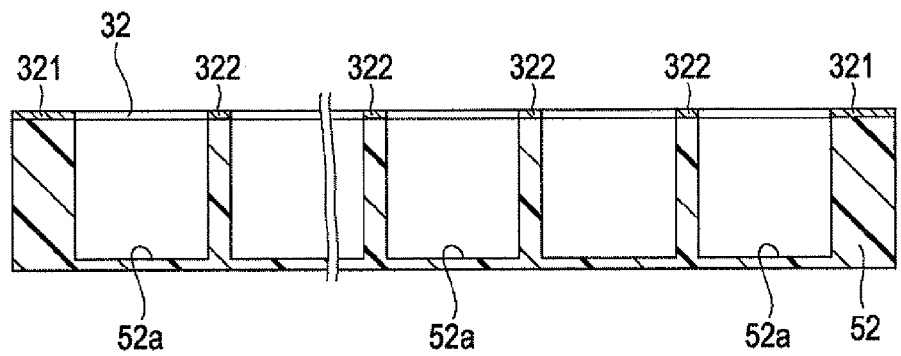

Referring to FIG. 4C, a tank is provided which contains, for example, a liquid metal 300 (a liquid containing a material for forming a conductive portion 32). The surface of the base 52 on which the recesses 52a are open is brought into contact with the liquid metal 300 and is immersed therein. In this manner, a conductive portion 32 (which includes a plurality of wires 322 arranged in a grid pattern, and a trim 321 surrounding the wires 322) is formed on the upper surface of the base 52 as illustrated in FIG. 4D.

Step A3

Figure 5A:
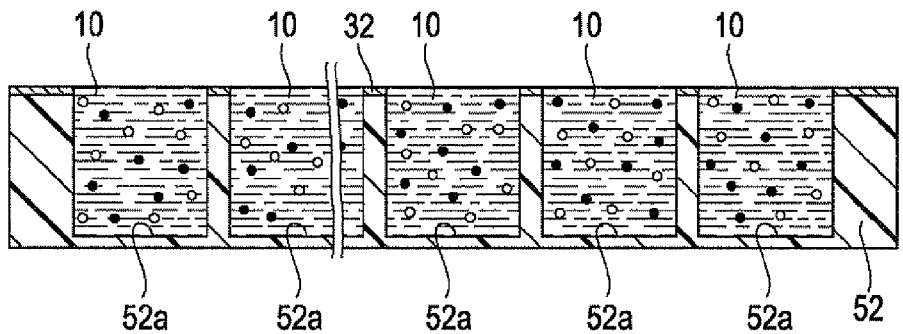
FIGS. 5A to 5D are sectional views illustrating a method for producing the display device shown in FIG. 1

Referring to FIG. 5A, an electrophoretic dispersion 10 is provided which contains white particles 7a and black particles 7b dispersed in a liquid phase dispersion medium 8, and the recesses 52a are each filled with the electrophoretic dispersion 10. Herein, the liquid level of the electrophoretic dispersion 10 coincides with the upper surface of the conductive portion 32, and is preferably higher than the upper surface of the conductive portion 32. In other words, the liquid level is preferably such that air will not remain in the recesses 52a. In this manner, air is prevented from remaining in the cells 51 and the display device 1 can be operated more stably.

Step A4

Figure 5B:
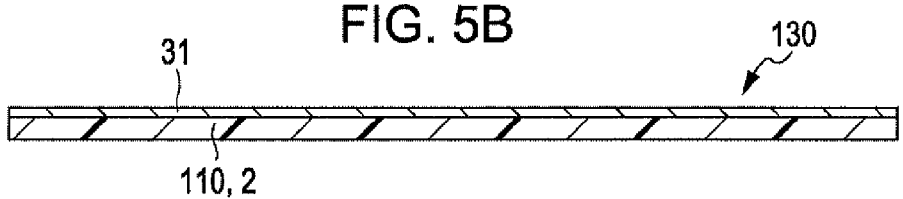

Referring to FIG. 5B, a colorless and transparent sheet member 110 (substrate 2) is provided, and a common electrode 31 is formed using an electrode material such as ITO on the upper surface of the sheet member 110. In this manner, a lid member 130 is obtained. The common electrode 31 may be formed by various membrane-forming methods such as deposition, sputtering and printing.

Figure 5C:
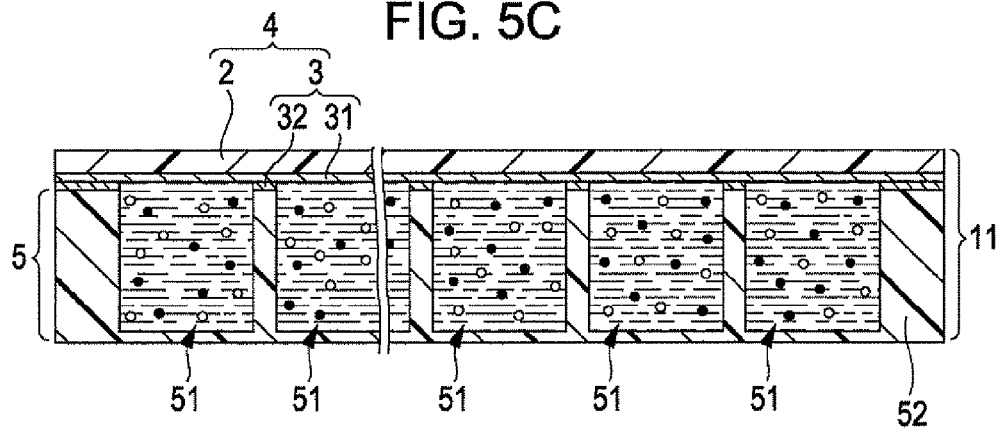

Next, as illustrated in FIG. 5C, the lid member 130 is joined to the base 52 (the wires 322 and the trim 321) such that the common electrode 31 is opposed to the base 52 and covers the openings of the recesses 52a. In this manner, the recesses 52a and the common electrode 31 define liquid-tight cells 51, and the conductive portion 32 is electrically connected with the common electrode 31. A display sheet 11 is manufactured through the above steps.

Step A5

Figure 5D:
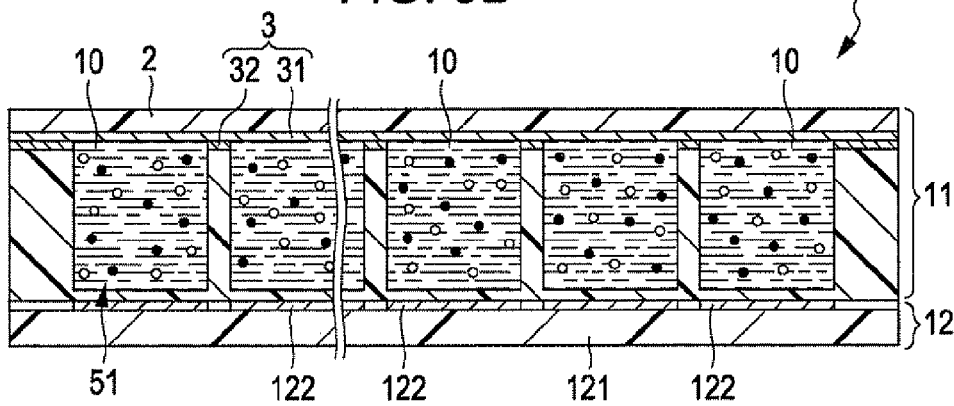

Referring to FIG. 5D, a previously provided circuit substrate 12 is joined with the display sheet 11 obtained in the step A4, thereby producing a display device 1.

According to the methods as described above, the display devices 1 may be manufactured easily. In particular, the steps A2 and A3 ensure that the cells 51 are filled with the electrophoretic dispersion 10, in other words, air (bubbles) is prevented from entering in the cells 51. As a result, the display device 1 achieves still improved display properties. The immersion in the step A2 can form the wires 322 and the trim 321 easily.

Alternatively, the display devices 1 may be manufactured as described below.

An alternative method for producing a display device 1 includes a step B1 of forming a conductive membrane 210 on the upper surface of a plate member 200 to prepare a member 220, a step B2 of forming a plurality of recesses 221 that are open on the upper surface of the member 220 (the surface on which the conductive membrane 210 is formed) thereby to form a base 52 and a conductive portion 32 simultaneously, a step B3 of filling the recesses 221 (52a) with an electrophoretic dispersion 10, a step B4 of providing a substrate 2 (lid member) having a common electrode 31 and joining the substrate 2 so as to cover the openings of the recesses 221 (52a), thereby producing a display sheet 11, and a step B5 of joining the display sheet 11 from the step B4 with a circuit substrate 12. Hereinbelow, the steps B1 to B5 will be sequentially described That is. However, since the steps B3 to B5 are similar to the steps A3 to A5, the description thereof is omitted.

Step B1

Referring to FIG. 6A, a plate member 200 is provided. Next, as illustrated in FIG. 6B, a conductive membrane 210 is formed on the upper surface of the member 200, thereby producing a member 220. The conductive membrane 210 may be formed by various membrane-forming methods such as deposition, sputtering and printing.

Step B2

Referring to FIG. 6C, a plurality of recesses 221 that are open on the upper surface of the member 220 (the surface on which the conductive membrane 210 is formed) are created. In this manner, a base 52 having the recesses 221 (52a), and a conductive portion 32 are formed simultaneously. The recesses 221 may be formed by known methods such as various etching methods including wet etching and dry etching, and sandblasting methods.

This alternative method can produce the display devices 1 easily similarly to the aforementioned production method. In particular, the steps B2 and B3 ensure that the cells 51 are filled with the electrophoretic dispersion 10, in other words, air (bubbles) is prevented from entering in the cells 51. As a result, the display device 1 achieves still improved display properties.

Second Embodiment

The second embodiment of the display devices will be described below focusing on the differences from the first embodiment. Thus, the description of the similarities to the first embodiment will be omitted.

FIG. 7 is a sectional view of a display surface side substrate included in a display device according to the second embodiment of the invention.

The display devices according to this embodiment are similar to the first embodiment except that the electrode layer has a differing structure.

As illustrated in FIG. 7, an electrode layer 3A in this embodiment has a conductive portion 32 formed on the lower surface of a substrate 2, and a common electrode 31 formed so as to cover the conductive portion 32. The conductive portion 32 is composed of a trim and wires as described above and is therefore present on part of the lower surface of the substrate 2. In this embodiment, the common electrode 31 in the form of a membrane is formed on the substrate 2 and over the conductive portion 32, and fills in at least regions of the substrate 2 that are exposed from the conductive portion 32.

The thickness of the common electrode 31 is smaller over the conductive portion 32 than in the regions where there is no conductive portion 32. As a result, the step height on the lower side of a display surface side substrate 4A is reduced compared to, for example, the first embodiment. That is, the level difference is smoother between the common electrode 31 alone, and the conductive portion 32 and the common electrode 31 laminated together. This enables that bubbles (air layers) are prevented from remaining in the vicinity of the steps more reliably when the display surface side substrate 4A is joined with a display layer 5. As a result, the display device 1 can be prevented from the degrading in display properties more reliably.

The display devices according to the second embodiment can achieve similar advantages to those in the previously described embodiment.

Third Embodiment

The third embodiment of the display devices will be described below focusing on the differences from the first embodiment. Thus, the description of the similarities to the first embodiment will be omitted.

FIG. 8 is a sectional view of a display surface side substrate included in a display device according to the third embodiment of the invention.

The display devices according to this embodiment are similar to the first embodiment except that the electrode layer has a differing structure.

As illustrated in FIG. 8, an electrode layer 3B in this embodiment has a conductive portion 32 formed on the lower surface of a substrate 2. Further, a common electrode 31 is formed on regions where there is no conductive portion 32 on the lower surface of the substrate 2.

That is, the common electrode 31 is formed so as to fill in regions enclosed by a pair of neighboring first wires 322a, 322a and a pair of neighboring second wires 322b, 322b, and regions enclosed by a trim 321 and wires 322.

As a result, the step height between the conductive portion 32 and the common electrode 31 is reduced compared to, for example, the first embodiment. This enables that bubbles (air layers) are prevented from remaining in the vicinity of the steps more reliably when a display surface side substrate 4B is joined with a display layer 5. As a result, the display device 1 can be prevented from the degrading in display properties more reliably.

Further, this embodiment allows for reducing the thickness of the electrode layer 3 compared to, for example, the first embodiment, and thereby facilitates further reduction of thickness of the display device 1. Furthermore, the electrode layers 3 can be formed thinner compared to the thickness according to the second embodiment, and thus manufacturing thinner display devices 1 may be facilitated.

The display devices according to the third embodiment can achieve similar advantages to those in the previously described embodiments.

Fourth Embodiment

Next, the fourth embodiment of the display devices will be described below focusing on the differences from the first embodiment. Thus, the description of the similarities to the first embodiment will be omitted.

Figure 9:
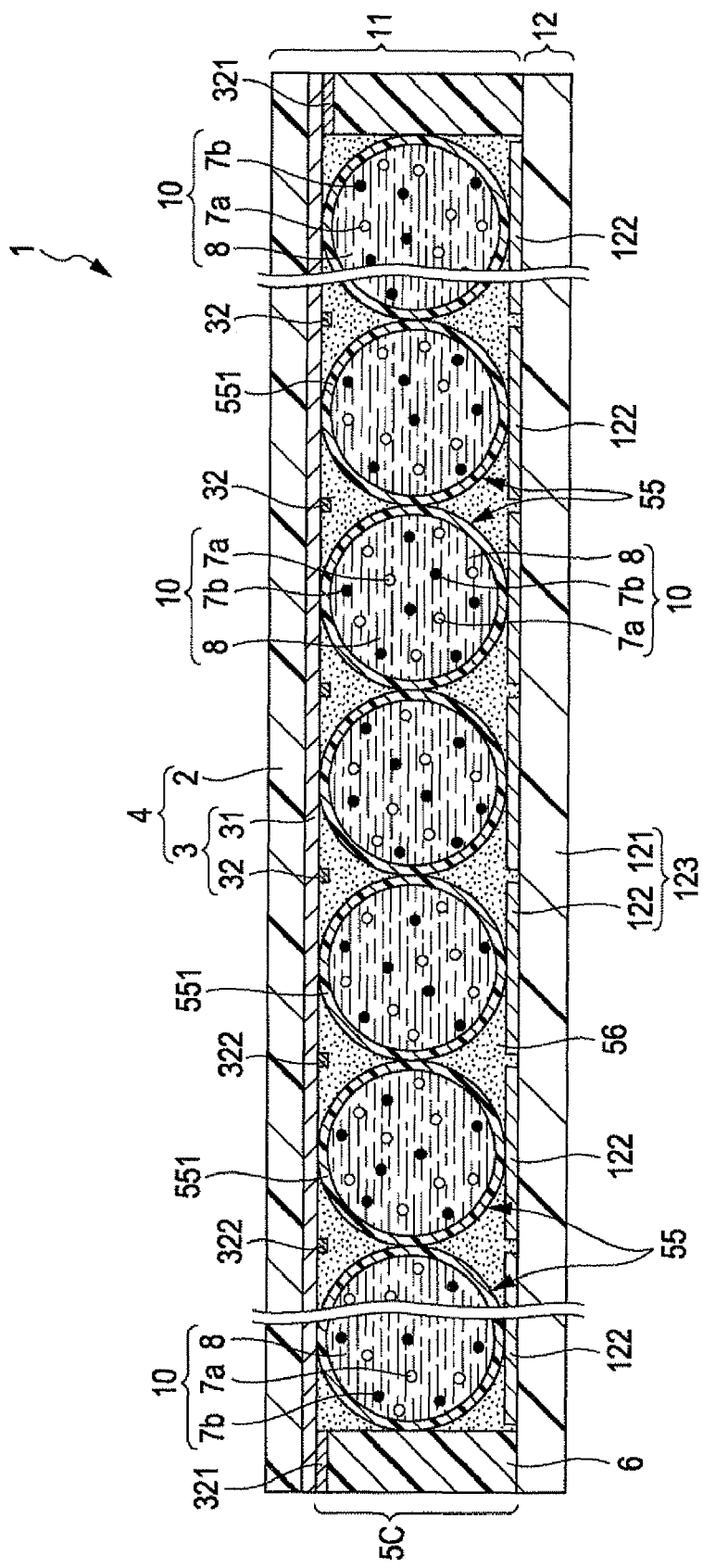
FIG. 9 is a schematic sectional view illustrating a display device according to a fourth embodiment of the invention.

FIG. 9 is a schematic sectional view of a display device according to the fourth embodiment of the invention.

The display devices according to this embodiment are similar to the first embodiment except that the display layer has a differing structure.

As illustrated in FIG. 9, a display layer 5C in this embodiment has a plurality of microcapsules (reservoirs) 55 in which an electrophoretic dispersion 10 is encapsulated in capsule bodies 551, and a binder 56 which holds the microcapsules 55.

Referring to FIG. 9, the microcapsules 55 are arranged in rows and columns in a single layer (one next to another without overlapping in the thickness direction) between a display surface side substrate 4 and a back side substrate 123, and stand in the entire range in the thickness direction of the display layer 5C. That is, the microcapsules 55 are arranged in contact with neighboring microcapsules in the plane direction of the display layer 5C and without being stuck in the thickness direction of the display layer 5C. The microcapsules 55 are substantially spherical (in a substantially spherical shape) without being compressed vertically.

The microcapsules 55 are aligned by wires 322 (protrusions defined by the wires 322) of a conductive portion 32 and are arranged avoiding regions between pixel electrodes 122 (in other words, so as not to straddle adjacent pixel electrodes 122). This arrangement provides still improved display properties of the display devices.

The shapes of the microcapsules 55 are not particularly limited because the microcapsules have a certain level of flexibility and change their shape with external pressure. In the absence of external pressure, the microcapsules 55 preferably have a particulate shape such as sphere. That is, the microcapsules 55 are preferably present as spherical as possible between the display surface side substrate 4 and the back side substrate 123.

The particle diameter (average particle diameter) of the microcapsules 55 is not particularly limited, but is preferably about 5 µm to 300 µm, more preferably about 10 µm to 200 µm, and still more preferably about 15 µm to 150 µm. If the particle diameter of the microcapsules 55 is less than 5 µm, a sufficient display density may not be obtained depending on the color hue, particle diameter, quantity (number) and the like of electrophoretic particles 7 contained in the microcapsules 55. On the other hand, microcapsules 55 having a particle diameter exceeding 300 µm may lower the capsule strength depending on the configuration (such as materials) of the microcapsules 55. Further, such large particle diameters may hinder satisfactory electrophoretic behavior of electrophoretic particles 7 in an electrophoretic dispersion 10 encapsulated in the microcapsules 55, possibly requiring a higher starting voltage for displaying. The particle diameter of the microcapsules 55 means a volume average particle diameter measured with a laser diffraction/scattering particle size distribution analyzer (for example, LA-910 manufactured by HORIBA Ltd., or Coulter Counter Multisizer 3 manufactured by Beckman Coulter Inc.).

The materials for making the capsule bodies 551 are not particularly limited. Examples thereof include gelatin, gum arabic/gelatin composite materials and various resin materials such as urethane resins, melamine resins, urea resins, epoxy resins, phenolic resins, acrylic resins, olefin resins, polyamide resins and polyether resins. These materials may be used singly, or two or more may be used in combination.

The binder 56 is provided for the purpose of, for example, fixing the display layer 5C to the display surface side substrate 4 and the back side substrate 123, fixing the microcapsules 55 with each other, or ensuring insulation between the common electrode 31 and the pixel electrodes 122. In this manner, the display device 1 achieves higher durability and reliability.

The binder 56 is suitably a resin material that has excellent affinity for (adhesion with) the display surface side substrate 4, the back side substrate 123 and the capsule bodies 551 and also has excellent insulation properties (having absolute insulation or permitting passage of very small electric current).

Examples of the binders 56 include synthetic resin binders such as (meth)acrylic resins, (meth)acryl urethane resins, polyvinyl chloride resins, polyvinylidene chloride resins, melamine resins, urethane resins, styrene resins, alkyd resins, phenolic resins, epoxy resins, polyester resins, polyvinyl alcohol resins, (meth)acryl silicone resins, alkyl polysiloxane resins, silicone resins, silicone alkyd resins, silicone urethane resins, silicone polyester resins and polyalkylene glycol resins, synthetic rubber or natural rubber binders such as ethylene-propylene copolymer rubbers, polybutadiene rubbers, styrene-butadiene rubbers and acrylonitrile-butadiene rubbers, and thermoplastic or thermosetting polymer binders such as cellulose nitrate, cellulose acetate butyrate, cellulose acetate, ethylcellulose, hydroxypropylmethylcellulose and hydroxyethylcellulose. These binders may be used singly, or two or more may be used in combination.

Of these binders 56, (meth)acrylic resins, polyester resins, urethane resins and polyalkylene glycol resins are preferable, and (meth)acrylic resins are particularly preferable from the viewpoints that the microcapsules 55 show relatively good dispersibility therein and these resins have excellent adhesion with the display surface side substrate 4, the back side substrate 123 and the capsule bodies 551.

Between the display surface side substrate 4 and the back side substrate 123, a sealing member 6 is provided along the edges of these substrates. The sealing member 6 provides an air-tight seal between the display surface side substrate 4 and the back side substrate 123 (i.e., in the display layer 5), and prevents water from entering the display device 1.

The materials for making the sealing members 6 include various resin materials, including thermoplastic resins such as acrylic resins, urethane resins and olefin resins, and thermosetting resins such as epoxy resins, melamine resins and phenolic resins. These materials may be used singly, or two or more may be used in combination. The sealing members 6 are optional and may be omitted.

The display devices according to the fourth embodiment can achieve similar advantages to those in the previously described embodiments.

Fifth Embodiment

The fifth embodiment of the display devices will be described below focusing on the differences from the fourth embodiment. Thus, the description of the similarities will be omitted.

Figure 10:
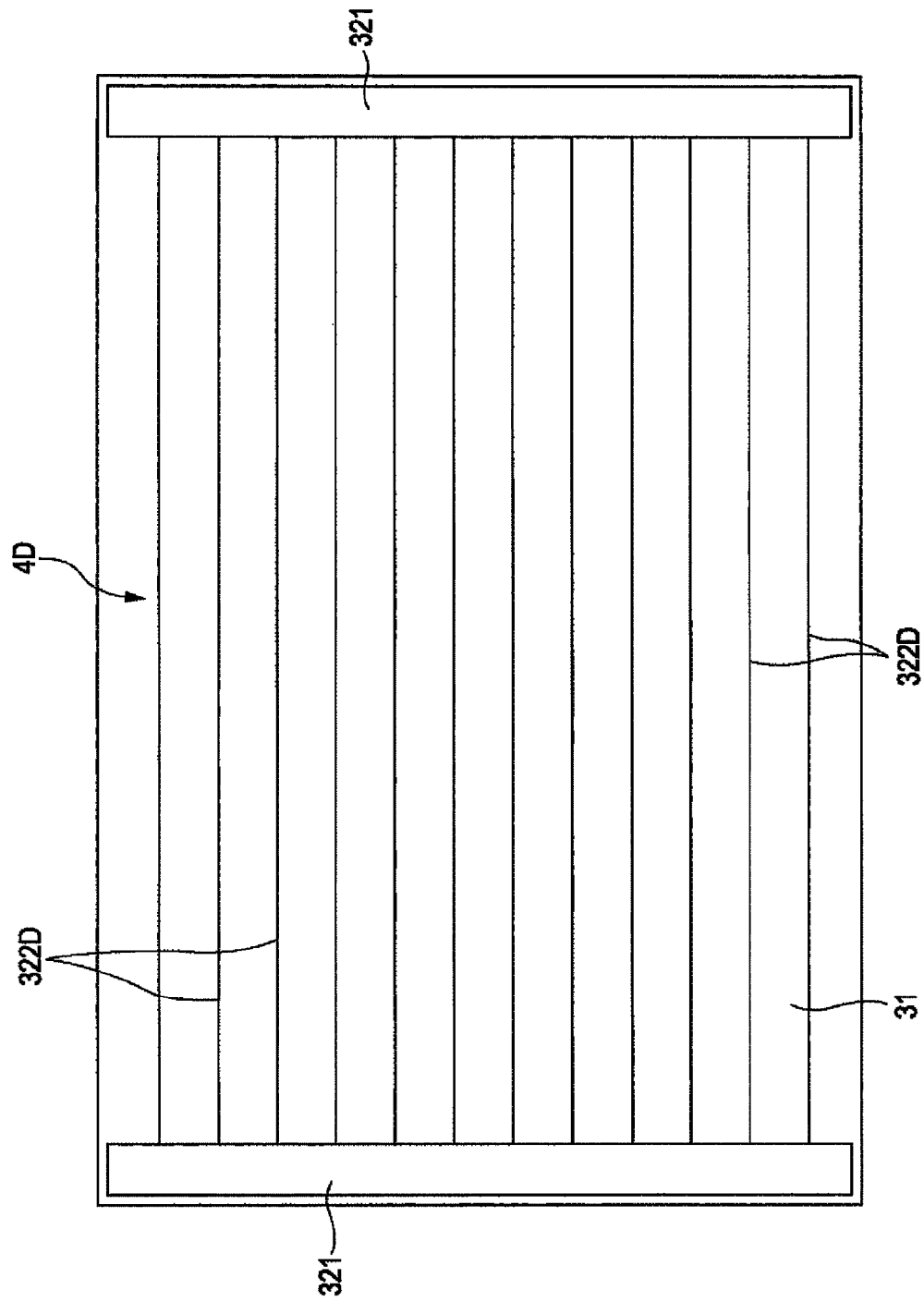
FIG. 10 is a plan view of a display surface side substrate included in a display device according to a fifth embodiment of the invention.

FIG. 10 is a plan view of a display surface side substrate included in a display device according to the fifth embodiment of the invention.

The display devices according to this embodiment are similar to the fourth embodiment except that the conductive portion has a differing structure.

As illustrated in FIG. 10, a conductive portion 32D in this embodiment has a plurality of wires 322D that are arranged in one direction and in parallel with each other. This arrangement can reduce the number of wires 322D compared to, for example, the first embodiment, and can further facilitate the formation of the wires 322D. Referring to FIG. 10, the plurality of wires 322D extend in the lateral direction because the conductive portion 32 is electrically connected with a circuit substrate at trims 321 described below (namely, at the left and right sides in FIG. 10).

When a display layer 5 and a display surface side substrate 4 are joined by lamination, the lamination is preferably made in the direction in which the wires 322D extend. In this manner, breakage or the like of the wires 322D during lamination can be effectively suppressed.

The trims 321 are two individual members that are separated in the extending direction of the wires 322D.

The display devices according to the fifth embodiment can achieve similar advantages to those in the previously described embodiments.

Electronic Apparatuses

The display devices 1 as described above may be incorporated in various electronic apparatuses. Electronic apparatuses of the invention having the display device 1 will be described below.

Electronic Papers

First, there will be described an embodiment in which the electronic apparatus of the invention is applied to electronic paper.

Figure 11:
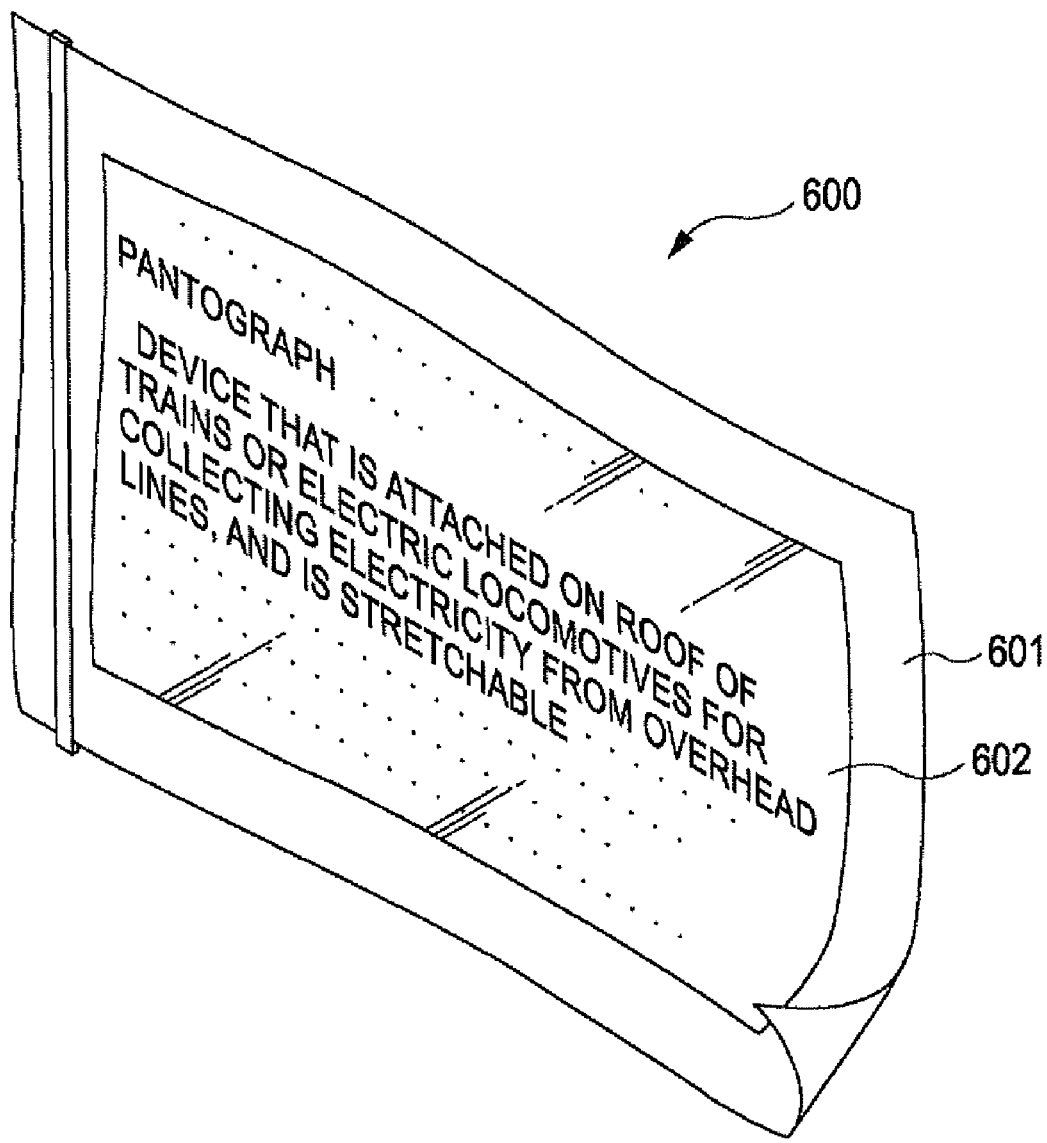
FIG. 11 is a perspective view illustrating an embodiment in which an electronic apparatus according to an aspect of the invention is applied to electronic paper.

FIG. 11 is a perspective view illustrating an embodiment in which the electronic apparatus of the invention is applied to electronic paper.

Electronic paper 600 illustrated in FIG. 11 has a body 601 that is composed of a rewritable sheet having a similar texture and flexibility to paper, and a display unit 602.

In such electronic paper 600, the display unit 602 is composed of the display device 1 as described hereinabove.

Displays

Next, there will be described an embodiment in which the electronic apparatus of the invention is applied to a display.

Figure 12A:
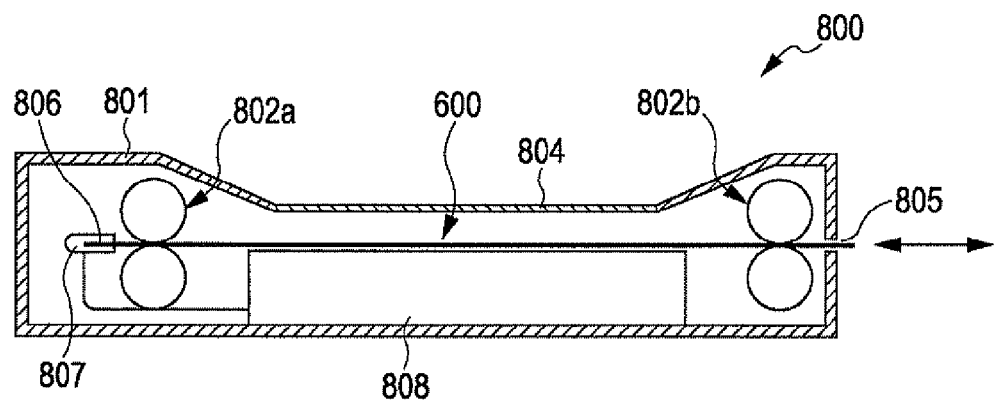
FIGS. 12A and 12B show an embodiment in which an electronic apparatus according to an aspect of the invention is applied to a display.
Figure 12B:
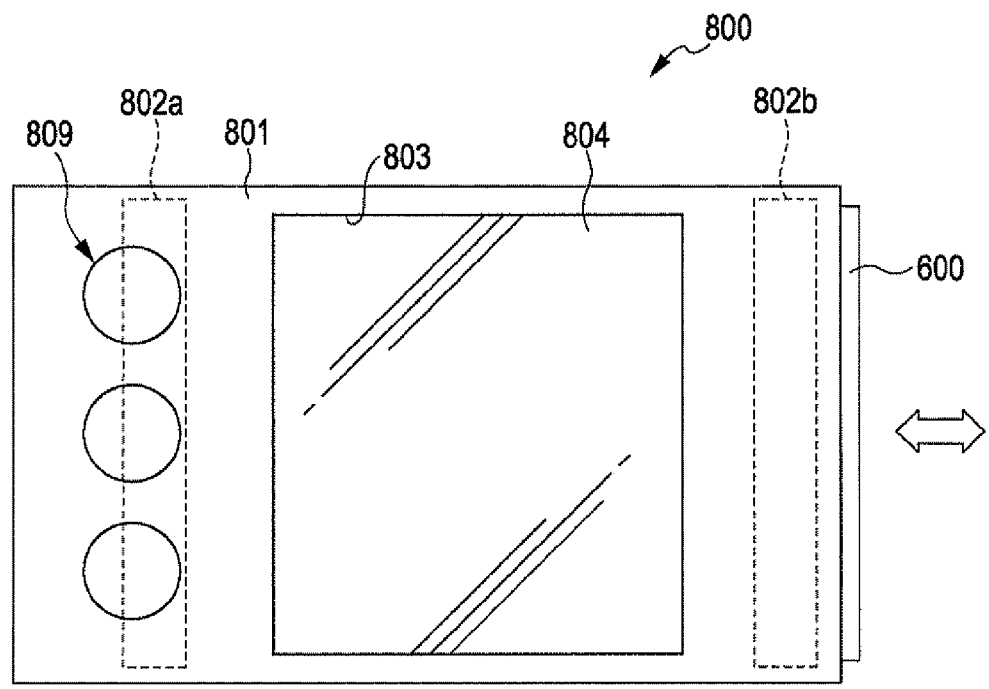

FIGS. 12A and 12B show an embodiment in which the electronic apparatus of the invention is applied to a display. FIG. 12A is a sectional view, and FIG. 12B is a plan view.

A display (display apparatus) 800 illustrated in FIGS. 12A and 12B includes a body 801, and electronic paper 600 detachable with the body 801. The electronic paper 600 has a configuration as described above, namely a similar configuration to that illustrated in FIG. 11.

The body 801 has an insertion opening 805 in its side (on the right side in FIG. 12A) through which the electronic paper 600 can be inserted, and also includes two pairs of transporting rollers 802a, 802b. When the electronic paper 600 is inserted through the insertion opening 805 into the body 801, the electronic paper 600 is pinched by the transporting rollers 802a, 802b and is set in the body 801.

On the display surface side of the body 801 (the front side of paper in FIG. 12B), a rectangular hole 803 is formed. A transparent glass plate 804 is fitted in the hole 803. According to this configuration, the electronic paper 600 installed in the body 801 can be viewed from the outside of the body 801. That is, the display 800 configures a display surface by letting the electronic paper 600 installed in the body 801 be seen through the transparent glass plate 804.

A terminal 806 is provided at the tip of the electronic paper 600 in the insertion direction (the left side in FIGS. 12A and 12B). A socket 807 is provided inside the body 801, to which the terminal 806 is connected once the electronic paper 600 is installed in the body 801. A controller 808 and control sections 809 are electrically connected with the socket 807.

In the display 800, the electronic paper 600 is detachably provided with the body 801, and may be used separate from the body 801 as a portable display.

In the display 800, the electronic paper 600 is composed of the display device 1 as described hereinabove.

The applications of the electronic apparatuses of the invention are not limited to those described above. Other possible applications include televisions, view finder video tape recorders, monitor direct view video tape recorders, car navigation systems, pagers, electronic notebooks, electronic calculators, electronic newspapers, word processors, personal computers, work stations, videophone systems, POS terminals and touch panels. The display devices 1 may be applied to the display sections of these electronic apparatuses.

The display sheets, the display devices, the electronic apparatuses, and the methods for manufacturing display sheets according to some aspects of the invention are described hereinabove based on some embodiments with reference to the accompanying drawings. However, such embodiments do not limit the scope of the invention, and the configurations of the members may be replaced by any other configurations having similar functions. Further, other members or configurations may be added to the invention. The display sheets, the display devices, the electronic apparatuses, and the methods for manufacturing display sheets may have any two or more of the configurations in the aforementioned embodiments.

In the foregoing embodiments, the conductive portions are described as having a trim. However, the invention is not limited to such embodiments and the trims may be omitted.

In the foregoing embodiments, the plurality of wires form a grid pattern. However, the invention is not limited to such embodiments. For example, it is also an embodiment of the invention to arrange a plurality of cells in a honeycomb pattern in plan view of a display layer and to arrange wires correspondingly in a honeycomb pattern. Further, wires may be formed so as to enclose a single cell, or wires may be provided so as to enclose a plurality of cells together.

The entire disclosure of Japanese Patent Application No. 2010-135322, filed Jun. 14, 2010 is expressly incorporated by reference herein.

What is claimed is:
1. A display sheet comprising:
a light-transmissive substrate,
an electrode layer formed on a surface of the substrate, and
a display layer that is provided on a surface of the electrode layer opposite the substrate and has a plurality of reservoirs containing at least one kind of electrophoretic particles, wherein
the electrode layer has a light-transmissive electrode and a conductive portion electrically connected with the electrode, and the conductive portion has a plurality of wires that are provided so as to overlap with the display layer in plan view of the display layer, the conductive portion being formed of a material with a lower electrical resistance than that of a material forming the electrode.

2. The display sheet according to claim 1, wherein the plurality of wires are provided in a grid pattern or a honeycomb pattern.

3. The display sheet according to claim 1, wherein the electrode is formed on a surface of the substrate, and the plurality of wires are each formed on a surface of the electrode opposite the substrate.

4. The display sheet according to claim 1, wherein the plurality of wires are each formed on a surface of the substrate, and the electrode is formed so as to cover the wires.

5. The display sheet according to claim 1, wherein the plurality of wires are formed on a surface of the substrate, and the electrode is formed in regions between pairs of adjacent wires.

6. The display sheet according to claim 1, wherein the plurality of wires are each formed between pairs of adjacent reservoirs in plan view of the display layer.

7. The display sheet according to claim 1, wherein each of the wires has a light reflectance of not more than 20%.

8. A display device comprising the display sheet described in claim 1.

9. An electronic apparatus comprising the display device described in claim 8.

10. A method for producing display sheets comprising:
forming a plurality of recesses in a plate member, the recesses being open on a surface of the plate member;
forming conductive wires on top areas of bulkheads formed between adjacent recesses;
filling each of the recesses with an electrophoretic dispersion containing at least one kind of electrophoretic particles; and
joining a lid member to the recessed plate member, the lid member having a light-transmissive substrate and a light-transmissive electrode on a surface of the substrate, the lid member being joined to the recessed plate member such that the electrode is in contact with the wires and covers the openings of the recesses.

11. The method for producing display sheets according to claim 10, wherein
the conductive wires are formed by immersing the surface of the plate member in a liquid that contains a material for forming the wires.

12. A method for producing display sheets comprising:
forming a conductive membrane on a surface of a plate member;
forming a plurality of recesses in the plate member, the recesses being open on the surface of the conductive membrane;
filling each of the recesses with an electrophoretic dispersion containing at least one kind of electrophoretic particles; and
joining a lid member to the recessed plate member, the lid member having a light-transmissive substrate and a light-transmissive membrane electrode on a surface of the substrate, the lid member being joined to the recessed plate member such that the electrode is in contact with the conductive membrane and covers the openings of the recesses.

* * * * *